UNITED STATES PATENT OFFICE.

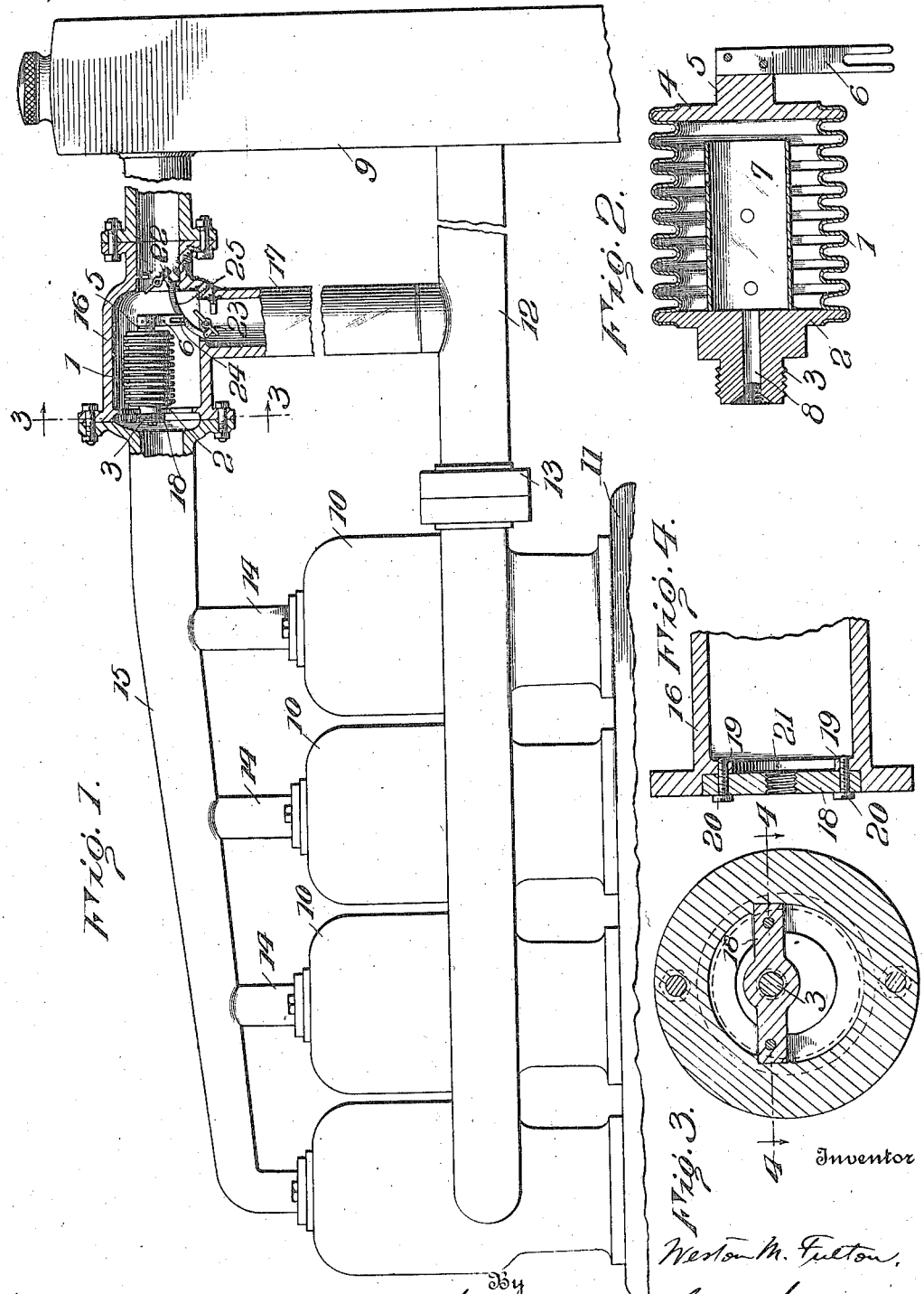

WESTON M. FULTON, OF KNOXVILLE, TENNESSEE, ASSIGNOR TO THE FULTON COMPANY, OF KNOXVILLE, TENNESSEE, A CORPORATION OF MAINE.

AUTOMATIC THERMOSENSITIVE DEVICE.

1,220,972.     Specification of Letters Patent.     Patented Mar. 27, 1917.

Application filed March 29, 1915. Serial No. 17,917.

*To all whom it may concern:*

Be it known that I, WESTON M. FULTON, whose post-office address is care of The Fulton Co., White avenue and Second street, Knoxville, Tennessee, have invented a new and useful Improvement in Automatic Thermosensitive Devices, which invention is fully set forth in the following specification.

This invention relates to automatic thermosensitive devices designed to control the temperature of a heated medium, and which normally act in response to temperature variations with this end in view; and the object of the invention is to provide against dangerous conditions, or an injury to the mechanism with which it is associated, in case the thermosensitive device gets out of order.

In devices of this character, it has heretofore been proposed to employ a thermosensitive mechanism consisting of an expansible and collapsible vessel within which is sealed a thermosensitive fluid under a pressure less than that of the medium by which the thermosensitive device is surrounded, and to utilize the expansion of the thermosensitive device under the influence of a rise of temperature to actuate an element, such, for example, as a valve, by means of which the source of heat affecting the thermosensitive device is controlled. Prior structures of this type are open to the objection that if by any chance the expansible and collapsible vessel should leak, and the pressure within and without the collapsible and expansible vessel become equalized, the thermosensitive device is thrown out of operation with the parts of the mechanism in position to permit the dangerous or injurious action which the entire device is designed to avoid. As devices of this character are frequently located where it is difficult to readily inspect the same, the inoperative condition due to the leakage in the expansible and collapsible vessel is not readily discoverable until the damage has been done.

The object of the present invention is to so construct and arrange a device of this character that under normal operative conditions it will prevent the dangerous or injurious conditions mentioned, and which in case of leakage in the expansible and collapsible vessel will leave the parts in a position where the dangerous or injurious conditions before mentioned will not arise. With this object in view, the invention consists, broadly stated, in connecting an expansible and collapsible vessel, (capable of being collapsed against an elastic force inherent in said vessel and having a thermosensitive fluid sealed therein at a pressure below that of the surrounding medium, and hence in collapsed condition), with the particular device or element (such as a valve mechanism) adopted for effecting the desired control, in such a way that the parts automatically move to a condition of safety when the vessel is expanded, to the end that the parts shall assume the position of safety whether the expansion of the vessel is due to a rise of temperature in the normal operation or is due to the elasticity of the vessel when a leak occurs. It will be understood that when the expansible and collapsible vessel has the thermosensitive fluid sealed therein at a pressure materially less than that of the surrounding medium, the vessel will be collapsed to a point where the external pressure will be balanced by the internal pressure plus the elastic force inherent in the vessel itself. When a leak occurs, equilibrium of pressure within and without the vessel results and the vessel is expanded under the influence of its own inherent elasticity.

One form which the invention may assume is that in which a heated medium, such as air or water, is conducted through a conduit in which the thermosensitive device is located, the flow of the medium through the conduit being controlled by suitable means, as a valve mechanism, operatively connected to the thermosensitive device in such a way that expansion of said device opens the valve mechanism and permits the free and uncontrolled flow of the medium through the conduit, whereas the collapse of the thermosensitive device serves to close the valve mechanism. When the valve mechanism is opened and the heated medium is permitted to flow uncontrolled through the conduit, it permits the escape of the heated medium, to the end that the temperaure within the conduit may be reduced. For example, the conduit may be a closed conduit and have a cooling device, such as a radiator, located therein, which acts to reduce the temperature of the medium, after which it is withdrawn from the cooler or radiator for reuse or other purposes, as may be desired.

As a convenient means of illustrating the principles of the invention, I have shown the same in the accompanying drawings in connection with a circulating water system and radiator for cooling automobile engines, but it is to be expressly understood that the invention is not limited to this particular use, the limits of the invention being defined in the appended claims.

In said drawings:—

Figure 1 is a view in elevation showing a water circulating system for an automobile engine, parts being broken away to show my improvements in connection therewith;

Fig. 2 is a longitudinal sectional view through the thermosensitive element;

Fig. 3 is a transverse sectional view on the line 3—3 of Fig. 1; and

Fig. 4 is a longitudinal sectional view on the line 4—4 of Fig. 3.

Referring to Fig. 2, 1 is a corrugated collapsible and expansible tubular vessel preferably of an elastic metal such as brass having a closure 2 which is adapted to support the vessel, and, for this purpose, the closure is provided with a threaded reduced portion 3 which can be screwed into a suitable support. The opposite end of the vessel is closed by an inflexible end wall 4 having a hub 5 to which is secured a power-transmitting member 6. Within the vessel is a tubular stop 7 preferably secured to the stationary end closure. This tubular stop is provided with perforations to permit circulation of the expansible fluid confined in the vessel and for insuring a uniform distribution of heat from the walls of the vessel, and is of such length that the vessel may contract considerably below its normal length. In the end closure 2 is drilled a hole 8 for charging the vessel with a volatile substance and for reducing the pressure within the vessel to the point where the atmospheric or external fluid pressure collapses the vessel until the movable end wall 4 rests against the stop for temperatures below those at which the thermosensitive element is designed to operate. The hole 8 is finally sealed by means of solder, or in any other suitable manner.

While it is preferred to construct the walls of the expansible and collapsible vessel of a resilient metal, this is not essential, since the walls might be of non-resilient material arranged to collapse against the tension of a spring. It is only essential that the collapse shall take place against some elastic force inherent in the vessel itself, whether such force be found in the metal walls of the vessel or a spring contained therein, or otherwise.

In Fig. 1 is shown a water circulating system for an automobile engine comprising a radiator 9 connected at its lower part to the cooling jackets 10 of a four-cylinder engine 11 through a supply pipe 12 in which is located a circulating pump 13. The heated water leaves the cooling jackets through branch pipes 14 which deliver it into a tapered return conduit 15 which connects with the radiator 9 near its top through an enlarged flanged section 16 which has a side by-pass connection 17 with the supply pipe 12. The manner of supporting the thermosensitive element in the section 16 is shown in Figs. 3 and 4, in which 18 is a bridge-piece resting on lugs 19 formed on the interior wall of the section 16 and made fast thereto by screws 20. The bridge 18 is provided with a threaded opening 21 which is adapted to receive the threaded hub 3 of the thermosensitive element 1. The bridge is preferably at one side of the center of the tubular section 16 for the purpose of affording space for operating the valves. The movements of the free end of the thermosensitive element are transmitted to two butterfly valves 22, 23 through forked member 6 which engages a pin 24 on a link 25 connected off center to each of the valves 22, 23. Valve 22 is located in the main return pipe leading to the radiator and is adapted to close the conduit when valve 23 is in wide open position.

Assume that the thermosensitive vessel has been charged as described, and is in its collapsed position for temperatures lower than that normally occurring in the water cooling system, and that the elasticity of the collapsed walls of the vessel gives power enough to operate the valves 22, 23 should the fluid pressure inside the vessel balance the pressure outside, a condition occurring when the vessel leaks. The hub 3 is screwed into the threaded opening in bridge 18, the member 6 is connected to the valve-operating link 25, and the flanged ends of section 16 are bolted to corresponding flanges in the return conduit.

When the engine is cold, the thermosensitive element has contracted until the movable end wall 4 rests against stop 7. The member 6, which moves with end wall 4, has drawn link 25 to the left, thereby closing valve 22 and opening valve 23 in the by-pass conduit 17. On starting the engine, the cooling liquid begins to circulate under the influence of the pump 13, or by convection when a pump is not used, and passes through by-pass 17, the cooling jackets and return conduit 15. Because the total capacity of the pipes is a small fraction of the combined capacities of the jackets, the engine cylinders will heat up very quickly. As the engine warms up, the temperature of the circulating liquid rises, the thermosensitive element expands and opens valve 22 and, to the same extent, closes valve 23. The radiator is now gradually made effective for cooling the circulating liquid without suddenly chilling the cylinders of the engine.

In the normal operation of the system, the thermostat responds to changes of temperature of the circulating liquid, and positions the valves 22, 23 to regulate the circulation through the radiator and by-pass in accord with the requirements of the engine. Should the thermostat leak as the result of accident, and fail to respond to changes of temperature, my improvement enables the thermostat to perform its last act, as a safety device. In the present example, the valves 22, 23 must be left in position to give free circulation through the radiator when the thermostat fails to respond to variations of temperature, and this insures against the radiator being cut out of the system under these conditions. The proper positioning of the valves in case of leak is effected in the following manner. In the absence of a leak the internal pressure on the walls of the vessel 1 is always less than the external pressure thereon substantially throughout the range of movement of the valves. In whatever position the end wall 4 may be when the leak occurs, equilibrium of fluid pressure is established on the opposite sides of the walls of the vessel by reason of the communication established through the accidental leak in the wall. If the vessel were in collapsed or partly collapsed position when the leak occurred, the elasticity of the walls would push the head 4 to the right and open valve 22, and if the vessel were in its extended position, the wall 4 would hold the valve 22 open. In either event, the thermosensitive element would leave the valve 22 in safety position, thereby insuring circulation through the radiator and protecting the system until such time as the element could be replaced or repaired.

While in the foregoing, as an illustration of the inventive idea, the thermosensitive fluid is described as sealed in the expansible and contractible vessel at a pressure below that of the surrounding medium, it will be readily understood by those skilled in the art that the full equivalent of such construction may be secured by partly filling the expansible and collapsible vessel in its collapsed condition with a volatile liquid at a suitable temperature under the same, or approximately the same, pressure as that of the surrounding medium in which it is to act, and then sealing the vessel while the same is still collapsed, and I desire it to be understood that I regard this as an equivalent of the construction wherein the thermosensitive fluid is sealed in the expansible and collapsible vessel at a pressure below the external pressure of the surrounding medium, and such construction is designed to be included in the broad claims hereof.

What is claimed is:

1. The combination in an automobile engine, of a circulating system including a radiator for cooling said engine, a by-pass connecting the conduit leading to the radiator with the conduit leading from the radiator, a valve controlling the conduit to the radiator, a valve controlling said by-pass, and a collapsible and expansible vessel capable of being collapsed against an elastic force inherent in said vessel, said vessel being located in said circulating system and operatively connected to said valves, said vessel having a thermosensitive fluid sealed therein and exerting an internal pressure therein below that of the surrounding medium in said conduit, whereby said vessel will expand and operate said valves in a predetermined way on a rise of temperature or the occurrence of a leak in said vessel.

2. In a device of the character described, the combination of a closed circuit for a heated medium, valve mechanism in said circuit, and a collapsible and expansible vessel capable of being collapsed against an elastic force inherent in said vessel, said vessel being subjected to the medium flowing through said circuit and operatively connected to said valve mechanism, said vessel having a thermosensitive fluid sealed therein and exerting an internal pressure therein below that of the surrounding medium in which said vessel works, whereby the vessel will expand and operate said valve mechanism in a predetermined way on a rise of temperature or the occurrence of a leak in said vessel.

3. In a device of the character described, the combination of a closed circuit for a heated medium, a vessel in said circuit capable of being collapsed against an elastic force inherent in said vessel, a thermosensitive fluid sealed in said vessel at a pressure below that of the surrounding medium, and a valve in said circuit that is closed when said vessel is in collapsed condition and opened when said vessel is expanded, whereby said valve is opened by the expansion of said vessel due to a rise of temperature or to a leak in said vessel.

4. In a device for controlling the flow of a heated medium through a conduit, the combination of a valve mechanism in said conduit the open position of which is a position of safety, and a thermosensitive device exposed to medium in said conduit and operatively connected to said valve mechanism, said thermosensitive device comprising an expansible and collapsible vessel collapsible against an elastic force inherent in said vessel and having a thermosensitive fluid sealed therein at a pressure below that of the surrounding medium and operating to open said valve mechanism when the vessel is expanded.

5. In a device of the character described, the combination of a closed circuit for a heated medium, a by-pass in said circuit, a valve mechanism controlling said circuit and said by-pass, a collapsible and expansible vessel collapsible against an elastic force inherent in said vessel and subject to the influence of the heated medium in said circuit, said vessel being operatively connected to said valve mechanism to move the same toward open position in the main circuit and toward closed position in the by-pass when the vessel is expanded and vice versa when the vessel is collapsed, and a thermosensitive fluid sealed in said vessel and exerting a pressure therein below that of the medium in said circuit.

6. In a device for controlling the flow of a heated medium through a conduit, the combination of valve means in said conduit, an expansible and collapsible vessel collapsible against an elastic force inherent in said vessel, which vessel is located in said conduit and operatively connected to said valve means, and provided with stop means limiting the collapse of the vessel within the limits of said elastic force, said vessel containing a volatile substance sealed therein under reduced pressure sufficient to enable atmospheric pressure to collapse a wall of said vessel into contact with said stop and overcome the resistance of said valve means for all temperatures below the temperature at which the device is to operate as a thermostat, said valve means moving into a predetermined position by the action of said elastic force when said reduced pressure is relieved by a leak in said vessel.

7. The combination of an automobile engine, a circulating system including a radiator for cooling said engine, a by-pass connecting the conduit leading to the radiator with the conduit leading from the radiator, a valve controlling the conduit to the radiator, a valve controlling said by-pass, a collapsible and expansible vessel collapsible against an inherent elastic force, said vessel being located in said circulating system and operatively connected to said valves, and stop means limiting the collapse of the vessel, said vessel containing a volatile thermosensitive substance sealed therein under a pressure below that of the medium in said circuit, whereby the pressure in said circuit will collapse a wall of said vessel into contact with said stop and move the valve in the conduit to the radiator toward closed position and the by-pass valve toward open position for all temperatures below the temperature at which the device is to operate as a thermostat, said valves moving into their opposite positions by the action of said elastic force when said reduced pressure is relieved by a leak in the vessel.

8. In a device for controlling the flow of a heated medium through a branched conduit, the combination of a valve mechanism in each branch of said conduit, and a collapsible and expansible vessel capable of being collapsed against an elastic force inherent in said vessel, said vessel being located in the main conduit adjacent said branches and operatively connected to each of said valve mechanisms to open one valve and close the other when said vessel is expanded, and to close the one and open the other when said vessel is collapsed, said vessel having a thermosensitive fluid sealed therein and exerting an internal pressure below that of the surrounding medium in said conduit.

9. In a device for controlling the flow of a heated medium through a closed circuit provided with a by-pass, the combination of a valve mechanism controlling the main circuit and the by-pass, and a collapsible and expansible vessel subject to the medium in said circuit and operatively connected to said valve mechanism to open the main conduit and close the by-pass when the vessel is expanded due to a rise of temperature or to a leak in said vessel, said vessel being collapsible against an elastic force inherent in said vessel and having a thermosensitive fluid sealed therein at a pressure below that of the surrounding medium.

10. In a device for controlling the flow of a heated medium through a closed circuit provided with a by-pass, the combination of a valve mechanism controlling the main circuit and the by-pass, and a collapsible and expansible vessel in said circuit operatively connected to said valve mechanism to open the main circuit and close the by-pass when the vessel is expanded and to close the main circuit and open the by-pass when the vessel is collapsed, said vessel being collapsible against an elastic force inherent in said vessel and having a thermosensitive fluid sealed therein at a pressure below that of the medium in said circuit.

11. In a device for controlling the flow of a heated medium through a closed circuit having a radiator and a by-pass around said radiator, the combination of a valve mechanism controlling the flow of the heated medium through the radiator and through the by-pass, and a collapsible and expansible vessel in said circuit operatively connected to said valve mechanism to close the valve to the radiator and open the valve to the by-pass when the vessel is collapsed and to open the valve to the radiator and close the valve to the by-pass when the vessel is expanded, said vessel being collapsible against an elastic force inherent in said vessel and having a thermosensitive fluid sealed therein at a pressure below the external pressure of the surrounding medium in said circuit.

12. In a device for controlling the flow of a medium through a conduit, the combination of a valve mechanism in said conduit the open position of which is a position of safety, and an expansible and collapsible vessel collapsible against an elastic force and having an elastic fluid sealed therein at a pressure below that of the surrounding medium, said vessel being subject to the medium flowing through said conduit and operatively connected to said valve mechanism to close the same when said vessel is collapsed and to open the same when said vessel is expanded, whereby said valve is opened by the expansion of said vessel due to a rise of temperature or to a leak in said vessel.

13. In a device for controlling the flow of a medium through a conduit, the combination of a valve mechanism in said conduit one position of which is a position of safety, and a collapsible and expansible vessel collapsible against an elastic force and having an elastic fluid sealed therein at a pressure below that of the surrounding medium, said vessel being exposed to the medium flowing through said conduit and operatively connected to said valve mechanism to move said valve mechanism to its position of safety upon the occurrence of a leak in said vessel.

14. In a device for automatically controlling the flow of a medium through a conduit, the combination of a valve mechanism in said conduit having a predetermined range of movement, one position of which is a position of safety, and an expansible and collapsible vessel operatively connected to said valve mechanism and exposed to the medium flowing through said conduit, said vessel being collapsible against an elastic force and having sealed therein a thermosensitive fluid exerting substantially throughout said range of movement an internal pressure less than the external pressure to which said vessel is subjected.

15. In a device for automatically controlling the flow of a medium through a conduit having a by-pass, the combination of a valve mechanism controlling the main conduit and the by-pass and having a predetermined range of movement, and an expansible and collapsible vessel operatively connected to said valve mechanism, said vessel being collapsible against an elastic force and having sealed therein a thermosensitive fluid exerting substantially throughout said range of movement an internal pressure less than the external pressure to which said vessel is subjected, expansion of said vessel opening said main conduit and closing said by-pass.

16. In a device for automatically controlling the flow of a medium through a conduit, the combination of a valve mechanism in said conduit having a predetermined range of movement, the open position of which is a position of safety, and an expansible and collapsible vessel operatively connected to said valve mechanism and subjected to the medium in said conduit, said vessel being collapsible against an elastic force and having sealed therein a thermosensitive fluid exerting substantially throughout said range of movement an internal pressure less than the external pressure to which said vessel is subjected, expansion of said vessel opening said valve.

In testimony whereof I have signed this specification in the presence of two subscribing witnesses.

WESTON M. FULTON.

Witnesses:
L. O. HOOD,
BYRON MYNATT.